Jan. 25, 1949.  J. G. LINDEMAN  2,460,137
HYDRAULIC COUPLING
Filed Oct. 30, 1945
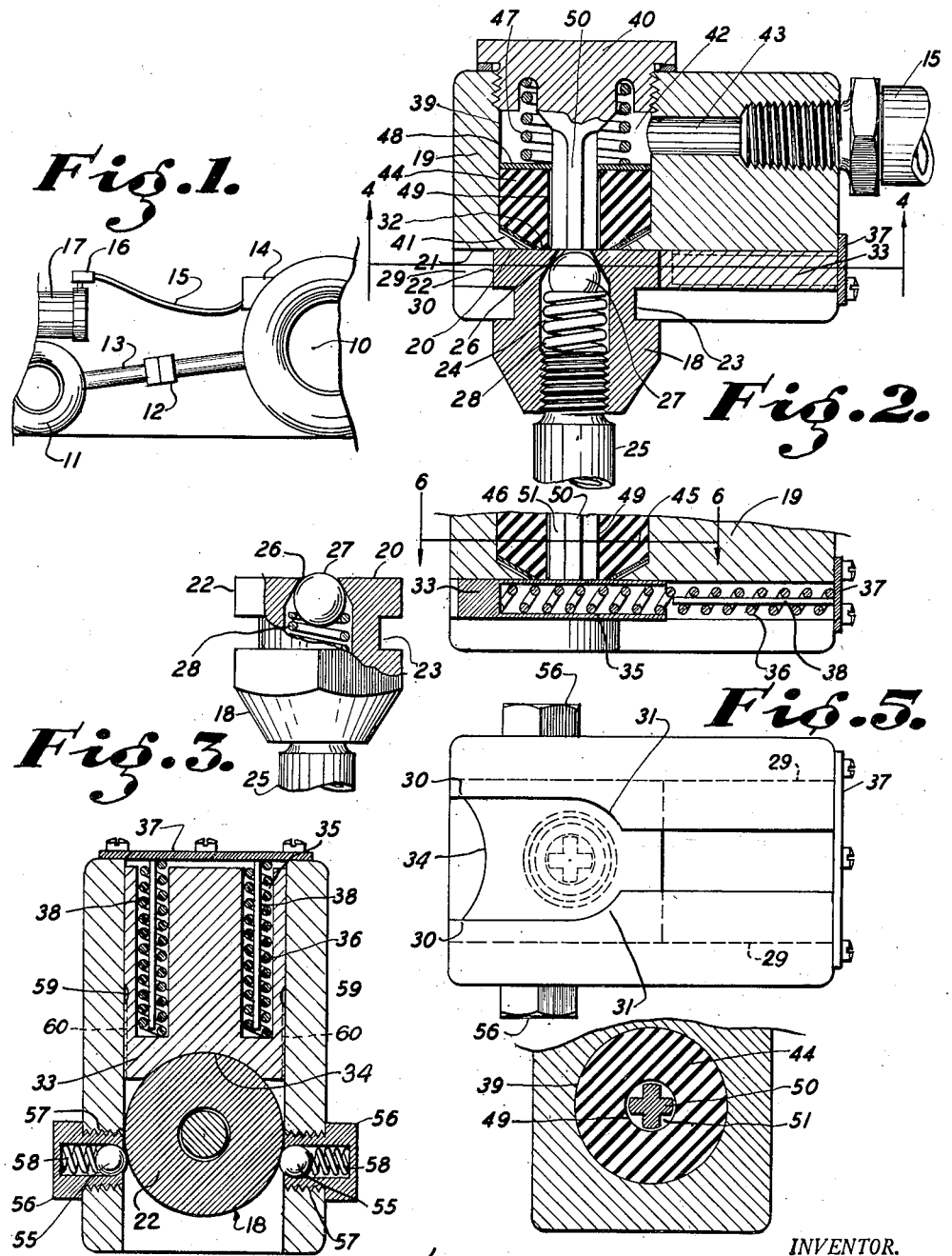
INVENTOR.
JESSE G. LINDEMAN
BY
*Jesse P. Wham*
ATTORNEY Patented Jan. 25, 1949

2,460,137

UNITED STATES PATENT OFFICE 2,460,137

HYDRAULIC COUPLING

Jesse G. Lindeman, Yakima, Wash., assignor, by mesne assignments, to John Deere-Lindeman Company, Yakima, Wash., a corporation of Washington Application October 30, 1945, Serial No. 625,643

3 Claims. (Cl. 284—17)

My present invention relates to hydraulic couplings and relates in particular to a hydraulic coupling which cannot be disconnected by hydraulic pressure, but which will become automatically disconnected or uncoupled when an excessive pull or translational force is applied to the coupling members.

Although it has many other uses, my present quick releasing hydraulic coupling is especially useful with hydraulically controlled equipment which is drawn by a tractor and is coupled to the tractor by means of an automatic disconnecting hitch which releases the drawn device from the tractor when the pulling force exerted through the hitch exceeds a predetermined value. When this break-away of the drawn device from the tractor occurs, my quick releasing coupling enables disconnection of the flexible hydraulic conduit which extends from the tractor to the drawn device for the purpose of carrying thereto the hydraulic fluid for operation of parts carried by the drawn device. As a further example of the utility of the invention, it is a practice to attach a plow to the draw bar of a tractor through a spring release draw bar connection which allows the tractor draw bar to become disconnected from the plow should the plow strike an obstacle in the soil heavy enough to cause the automatic spring release to disconnect the plow from the tractor, thereby avoiding breakage of the plow or associated parts as a result of its engagement with a heavy or immovable obstacle in the soil. With the ordinary fittings now employed for connecting the hydraulic hose to the lift mechanism of the plow, the hydraulic hose or some other associated part is broken before the operator of the tractor becomes aware of the detachment of the plow and stops the tractor. With my present invention, however, a slight pull on the hose will disconnect one part of the coupling from the other so that injury cannot occur.

It is an object of the invention to provide a quick releasing hydraulic coupling having a male part and a female part in sliding cooperation, the female part having a shutter which moves back and forth between valve covering and retracted positions as the male and female coupling parts are disengaged and engaged.

An object of the invention is to provide a hydraulic coupling of the character described herein, wherein one of the coupling bodies has means for attaching a hose thereto in such position that tension applied to the hose will exert a force parallel to the plane along which the coupling part slides into and out of connected relation, there being means for yieldably holding the coupling parts together so that when a pull is exerted on the hose in excess of the holding force exerted by the yieldable holding means, the cooperating parts of the connector will slide relatively out of engagement.

A further object of the invention is to provide a hydraulic coupling having a pair of cooperating connector bodies which are slidable into and out of engagement along a plane defined by the cooperating faces of these bodies, both of the bodies having passages therein which are brought into communication when the bodies are slid together into connected relation, the passages of both bodies having valve means associated therewith which are operative to close off the passages from the exterior when the connector bodies are disengaged.

A further object of the invention is to provide a device of the character described in the preceding paragraph wherein the passage of one of the bodies has a valved port communicating with its face and the other body has an opening aligned with the valved port when the bodies are slid together into connecting relation, there being sealing means for engagement with the face of the first body around the port therein.

A further object of the invention is to provide a quick detachable hydraulic coupling of the character set forth in the foregoing having a shutter which covers the opening and sealing means of the second body, thereby closing the opening and protecting the sealing means from dirt when the connector bodies are disconnected.

A further object of the invention is to provide a simple means whereby hydraulic pressure within the device forces the sealing means of the second connector body into tight sealing engagement with the face of the first connector body around the port therein.

Further objects and advantages of the invention may be brought out in the following part of the specification.

Referring to the drawings which are for illustrative purposes only,

Fig. 1 is a schematic view showing a preferred embodiment of my invention in connecting the hydraulic mechanisms of releasably connected vehicles.

Fig. 2 is an enlarged longitudinal sectional view through the hydraulic coupling with the parts thereof in connected relation.

Fig. 3 is a partly sectioned view showing the hydraulic coupling with the parts thereof in disconnected relation.

Fig. 4 is a sectional view taken as indicated by the line 4—4 of Fig. 2.

Fig. 5 is a bottom plan view of the second connector body with the shutter thereof in a position to close the fluid opening of the connector body.

Fig. 6 is a fragmentary sectional view taken as indicated by the line 6—6 of Fig. 3.

In the practice of the invention, as shown in Fig. 1, leading and following vehicles 10 and 11, fragmentarily shown, are connected by an automatically releasing hitch 12 which will disconnect the following vehicle 11 from the leading vehicle 10 when the tension applied to the draw bar 13 exceeds a predetermined value. On the leading vehicle 10, I provide a hydraulic mechanism 14 which may consist of a pump or compressor arranged to be connected through a hose 15 and a quick releasing coupling 16 with a hydraulic mechanism 17 on the following vehicle 11. This hydraulic mechanism 17 may consist of a cylinder-piston device for actuating parts carried by the following vehicle 11.

As shown in Fig. 2, the coupling 16 comprises a first body 18 and a second body 19. The first body 18 has a plane upper face 20 which cooperates with the plane lower face 21 of the second body 19. The upper end of the body 18 is circular in cross section and has a flange 22 disposed above an annular groove 23. An axial opening 24 in the body 18 is threaded at its lower end so that it may be screwed onto the upper end of a nipple 25 by which the body 18 is connected to the hydraulic mechanism 17. The upper end of the passage 24 is constricted so as to provide a valve port 26 which communicates with the upper face 20 of the body 18. A valve closure in the form of a ball 27 is disposed in the upper end of the passage 24 in a position with respect to the port 26 to close the same when the bodies 18 and 19 are disconnected as shown in Fig. 3, the ball 27 being forced upward by means of a spring 28 and being of such size with relation to the port 26 that a dome-like portion of the ball 27 projects above the upper face 20 of the body 18.

The flange 22 of the body 18 forms part of a guide means whereby the bodies 18 and 19 may be slid relatively together and apart along a plane defined by the faces 20 and 21. To cooperate with the flange 22, the second body 19 has a channel 29 adjacent its lower face 21, the lower extremity of this channel 29 being defined by horizontal lips 30 adapted to enter the groove 23 of the body 18 when the bodies 18 and 19 are in connected relation. As shown in Fig. 5, the lips 30 have converging portions 31 to limit the inward movement of the body 18 relatively to the body 19 and so position the body 18 that its port 26 will be in centralized relation to an opening 32 in the body 19 which communicates with its face 21. In the channel 29 there is a shutter 33 which has the same vertical dimension as the flange 22 of the body 18, and which, as shown in Fig. 4, is of generally rectangular form with an arcuate depression 34 in its front edge to cooperate with the periphery of the flange 22 and assist in guiding the flange 22 from the position in which it is shown in Fig. 3 into the channel 29 when the bodies 18 and 19 are moved relatively from disconnected relation, as shown in Fig. 3 into connected relation as shown in Fig. 2. The shutter has therein rearwardly extended openings 35 to receive compression springs 36 which urge the shutter 33 from the position in which it is shown in Figs. 2 and 4 into the covering position in which it is shown in Figs. 3 and 5. A plate 37 secured to the rear or rightward end of the body 19 covers the end of the channel 29, this plate 37, as shown in Fig. 4, having secured thereto inwardly projecting pins 38, aligned with the openings 35 in the shutter 33 and serving as guides for the springs 36 when the shutter 33 is moved leftward from the position in which it is shown in Fig. 4.

As best shown in Fig. 2, the body 19 has a bore 39 leading down from its upper face in alignment with the opening 32, the upper end of this bore 39 being threaded so that it may be closed by a cap 40. At the lower end of the bore 39 there is a generally conical wall 41, converging to the opening 32, which opening 32 is materially larger in diameter than the port 26 of the body 18. By generally conical form, I mean that the wall 41 need not be truly conoidal, but shall have the general diverging characteristics found in cones or multi-sided pyramids. The bore 39 forms a pressure chamber 42 to which the hose 15 may be connected through a passage 43.

In the lower part of the chamber 42 there is a cylindrical body 44, made of a material referred to as rubbery, in that it has the general characteristics of rubber. Preferably, the body 44 is of an oil resisting synthetic, such as neoprene. The lower end of the body 44 is of general conoidal shape corresponding to the bottom wall 41 of the chamber 42 and a dished washer 45 is disposed between the lower end of the body 44 and the wall 41, the inner edge of this washer 45 being of such diameter that it will project slightly into the opening 32, but will leave the lower annular portion 46 of the lower end of the body 44 exposed for engagement with the cooperating face 20 of the body 18 surrounding the port 26, when the bodies 18 and 19 are in connected relation as shown in Fig. 2. A compression spring 47, disposed between the cap 40 and a washer 48 which engages the upper face of the body 44, forces the body 44 downward so that its lower annular end portion 46 will be urged toward engagement with the face 20 of the body 18. It will be understood that hydraulic pressure existing in the chamber 42 will supplement the force of the spring proportionately to whatever pressure may be applied to the chamber 42, this hydraulic pressure assuring an effective seal between the lower annular portion 46 of the body 44 and the portion of the surface 20 surrounding the port 26.

The invention also provides a simple means for moving the ball 27 in open relation to the port 26 when the bodies 18 and 19 are moved from their disconnected relation in Fig. 3 to the connected relation in which they are shown in Fig. 2. It will be noted that the resilient body 44 has an axial opening 49 therethrough, this opening communicating with the port 26. A pin 50 extends down from the cap 40 through the opening 49 and has its lower end face disposed substantially in the plane of the face 21 of the body 19. The pin 50 has a plurality of longitudinal grooves or channels 51 through which the hydraulic fluid may flow between the chamber 42 and the passage 44 of the body 18. When the body 19 is slid onto the flange 22 of the body 18, the dome like upwardly projecting portion of the ball 27, Fig. 3, will be forced downwardly by the surface 21 of the body 19, and when the body 19 reaches the position with relation to the body 18, in which it is shown in Fig. 2, the lower end face of the pin 50 will hold the ball 27 in depressed position as shown in Fig. 2, thereby opening the valve port 26 and establishing communication between the passage 24 of the body 18 and the passages which are formed by the channels 51 in the pin 50. As this operation of engagement between the parts 18 and 19 is performed, the shutter 33 will be forced back from the position in which it is shown in Fig. 5 to the position in which it is shown in Fig. 2, and when the bodies 18 and 19 are disengaged, the springs 36 will force the shutter 33 back into the position in which it is shown in Figs. 3 and 5 to cover the opening 32, the upper face of the shutter 33 then engaging the seal provided by the lower annular portion 46 of the body 44, the upper surface of the shutter 33 then being substituted for the upper surface 20 of the body 18 and serving to close the chamber 42 against escape of hydraulic fluid therefrom. Of course, when the body 18 is disconnected from the body 19, the spring 28 will urge the valve ball 27 upward so as to close the port 26. The closing of the valves represented by the shutter 33 and the ball 27 not only protects the separated parts of the hydraulic system from escape of fluid, but prevents entry of foreign materials thereinto.

The inner annular edge of the dished washer 45 which projects into the opening 32, serves as a protection for the annular sealing wall 46 at the lower end of the body 44. It will be understood that if both the body 18 and the shutter 33 were at the same time removed from the channel 29, the inner edge of the washer 45 would project slightly below the face 21 of the body 19. Also, the body 44, being resilient is compressed and deflected by fluid pressure in the chamber 42 so that the lower annular portion 46 tends to protrude from the opening defined by the inner edge of the washer 45 and thereby make tight sealing engagement with the upper face 20 of the body 18 or the upper surface of the shutter 33. From Fig. 1, it will be noted that the leftward end of the hose 15 extends substantially horizontally or along a line substantially parallel to the plane defined by the surfaces 20 and 21 along which the bodies 18 and 19 slide into and out of engagement. Accordingly, should the following vehicle 11 break away or be released from the leading vehicle 10 by the releasing action of the automatic releasing hinge 12, the horizontal tension exerted through the hose 15 as the leading vehicle 10 moves rightward away from the vehicle 11 will pull the body 19 off from the body 18 without breaking the hose 15. At this time the valve 27 will close and the shutter will be moved by the spring 36 into a position to cover the opening 32, thereby protecting both ends of the hydraulic system. When the vehicles 10 and 11 are reconnected, the hydraulic system may be reestablished merely by sliding the body 19 back onto the body 18.

Detent means in the form of balls 55 are provided for yieldably maintaining engagement of the bodies 18 and 19. These detent balls 55 are held in bored screws 56 which pass substantially through threaded openings 57 in the sides of the body 19 substantially on the level of the channel 29, slightly ahead of the center of the body 18 when it is in its operative position relatively to the body 19, as shown in Fig. 4.

Springs 58 urge the balls 55 into engagement with the periphery of the flange 22 in eccentric relation thereto so that some force is required to move the flange 22 out of the channel 29. The detent balls 55 also serve to limit the outward movement of the shutter 33 by engaging pockets 59 formed in the edges thereof. Shallow channels 60 lead from the pockets 59 to the front end of the shutter 33 so that when the flange 22 is moved out of the channel 29, the springs 36 may move the shutter 33 from the position in which it is shown in Fig. 4 into the position thereof in Fig. 5, the channels 60 traversing the balls 55 and the shutter 33 being stopped in the position thereof shown in Fig. 5 when the depressions 59 move into engagement with the balls which then prevent further leftward movement of the shutter 33.

I claim as my invention:

1. A fluid line coupling, comprising: first and second coupling elements, each including a fluid passage, constructed and arranged for separable interconnection with the fluid passages positioned for communication with each other; means providing a guideway in the first element generally normal to and intersecting the fluid passage therein; means on the second element cooperable with a portion of said guideway to provide for the interconnection of the elements; a valve movably carried in the guideway and operable between open and closed positions as respects the fluid passage in said first element and normally occupying an open position in another portion of the guideway, being retained in that position by the aforesaid means on the second element; means biasing the valve toward closed position; and detent means carried by the first element and releasably retaining the second element against separation and operable after separation of the elements to engage the valve, upon movement of the latter to closed position, for retaining said valve in closed position.

2. A fluid line coupling, comprising: first and second coupling elements, each including a fluid passage, constructed and arranged for separable interconnection with the fluid passages positioned for communication with each other; means providing a guideway in the first element generally normal to and intersecting the fluid passage therein; a valve movably carried in the guideway and operable between open and closed positions as respects the fluid passage in said first element and normally occupying an open position in the guideway, being retained in that position by interconnection of the elements; means biasing the valve toward closed position; and detent means carried by the first element and releasably retaining the second element against separation and operable after separation of the elements to engage the valve, upon movement of the latter to closed position, for retaining said valve in closed position.

3. A fluid line coupling, comprising: first and second coupling elements, each including a fluid passage, constructed and arranged for separable interconnection with the fluid passages positioned for communication with each other; means providing a guideway in the first element; a valve movably carried in the guideway and operable between open and closed positions as respects the fluid passage in said first element and normally occupying an open position in the guideway, being retained in that position by interconnection of the elements; means biasing the valve toward closed position; and means carried by the first element and releasably retaining the second element against separation and operable after separation of the elements to engage the valve, upon movement of the latter to closed position, for retaining said valve in closed position.

JESSE G. LINDEMAN.

(References on following page)

REFERENCES CITED

The following references are of record in the file of this patent:

UNITED STATES PATENTS

| Number | Name | Date |
|---|---|---|
| 385,740 | Wilder | July 10, 1888 |
| 1,671,091 | McGahey | May 22, 1928 |
| 1,673,003 | Fesler | June 12, 1928 |
| 2,083,591 | Barks | June 15, 1937 |
| 2,251,574 | O'Neill | Aug. 4, 1941 |
| 2,317,827 | Townhill | Apr. 27, 1943 |
| 2,410,410 | Garubo | Nov. 5, 1946 |

FOREIGN PATENTS

| Number | Country | Date |
|---|---|---|
| 1,556 | Great Britain | Jan. 23, 1899 |